United States Patent
Martetschläger et al.

(10) Patent No.: US 8,081,065 B2
(45) Date of Patent: Dec. 20, 2011

(54) DEVICE FOR PROTECTING A PHOTOVOLTAIC PLANT AGAINST RODENT BITE DAMAGE

(75) Inventors: Stefan Martetschläger, Linz/Donau (AT); Gerald Ortner, Linz/Donau (AT)

(73) Assignee: Fronius International GmbH, Pettenbach (AT)

( * ) Notice: Subject to any disclaimer, the term of this patent is extended or adjusted under 35 U.S.C. 154(b) by 308 days.

(21) Appl. No.: 11/922,514

(22) PCT Filed: Apr. 25, 2006

(86) PCT No.: PCT/AT2006/000164
§ 371 (c)(1),
(2), (4) Date: Dec. 19, 2007

(87) PCT Pub. No.: WO2007/022550
PCT Pub. Date: Mar. 1, 2007

(65) Prior Publication Data
US 2009/0278669 A1 Nov. 12, 2009

(30) Foreign Application Priority Data
Jul. 8, 2005 (AT) ................ A 1160/2005

(51) Int. Cl.
*G08B 3/10* (2006.01)
(52) U.S. Cl. ............... 340/384.2; 340/384.1; 340/573.2; 119/428; 119/712; 119/721
(58) Field of Classification Search ............... 340/384.2, 340/384.1, 573.2; 116/22 A; 367/139, 137; 119/329, 650, 712, 713, 719, 428, 57.85, 119/721
See application file for complete search history.

(56) References Cited

U.S. PATENT DOCUMENTS

| | | | |
|---|---|---|---|
| 4,484,315 A | 11/1984 | Hall | |
| 5,214,619 A | 5/1993 | Yoshida | |
| 5,864,516 A | 1/1999 | Brown et al. | |
| 5,929,538 A | 7/1999 | O'Sullivan et al. | |
| 6,209,674 B1 * | 4/2001 | Buhring | 180/282 |
| 6,248,068 B1 * | 6/2001 | Seabron | 600/437 |
| 6,396,239 B1 * | 5/2002 | Benn et al. | 320/101 |
| 6,431,122 B1 * | 8/2002 | Westrick et al. | 119/721 |
| 6,570,494 B1 | 5/2003 | Leftridge, Sr. | |

(Continued)

FOREIGN PATENT DOCUMENTS
DE    34 43 568 A1    5/1985
(Continued)

OTHER PUBLICATIONS
International Search Report.

*Primary Examiner* — Hoi Lau
(74) *Attorney, Agent, or Firm* — Collard & Roe, P.C.

(57) ABSTRACT

The invention relates to a device for protecting a photovoltaic plant (1) against rodent bite damage, wherein the photovoltaic plant (1) comprises several components, among them solar cells (2), a control unit (5), an inverter (7), an internal voltage supply means (13) and at least one microcontroller (9) which are interconnected via corresponding lines (3, 6, 8, 11). To provide such a device which offers an optimum protection against damage caused by bites and which entails as little maintenance and installation expenditures as possible, an ultrasonic transmitter (12) is provided for emitting an ultrasonic signal, and the ultrasonic transmitter (12) is connected to a microcontroller (9) of the photovoltaic plant (1) such that the ultrasonic signal emitted is controllable via the photovoltaic plant (1).

13 Claims, 2 Drawing Sheets

U.S. PATENT DOCUMENTS

Figure 1:
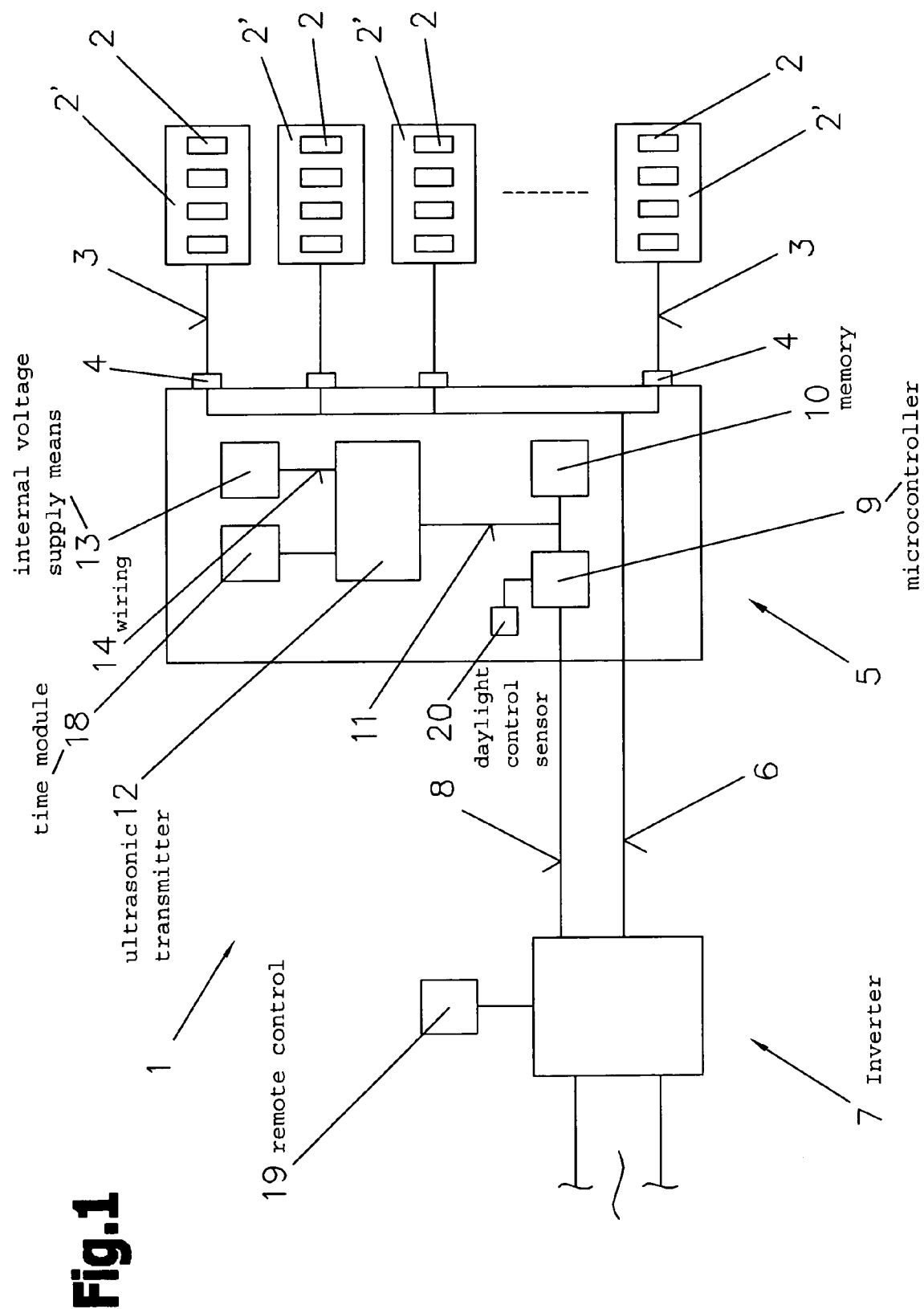

| | | | |
|---|---|---|---|
| 6,655,319 B2 * | 12/2003 | Marshall | 119/428 |
| 7,113,098 B1 * | 9/2006 | Hayes | 340/573.2 |
| 2002/0195062 A1 * | 12/2002 | Marshall | 119/428 |
| 2003/0047209 A1 | 3/2003 | Yanai et al. | |
| 2003/0058740 A1 * | 3/2003 | Jincks | 367/139 |
| 2004/0169585 A1 * | 9/2004 | Smith et al. | 340/384.2 |
| 2004/0219890 A1 * | 11/2004 | Williams et al. | 455/100 |
| 2004/0223223 A1 * | 11/2004 | Lee | 359/551 |

FOREIGN PATENT DOCUMENTS

| | | |
|---|---|---|
| DE | 41 25 402 A1 | 2/1993 |
| DE | 102 41 835 A1 | 3/2004 |
| DE | 203 19 735 | 3/2004 |
| EP | 0 664 079 B1 | 7/1995 |
| SE | 469 312 B | 6/1993 |
| WO | WO 94/06287 A | 3/1994 |

* cited by examiner

DEVICE FOR PROTECTING A PHOTOVOLTAIC PLANT AGAINST RODENT BITE DAMAGE

CROSS REFERENCE TO RELATED APPLICATIONS

Applicants claim priority under 35 U.S.C. §119 of Austrian Application No. A 1160/2005 filed Jul. 8, 2005. Applicants also claim priority under 35 U.S.C. §365 of PCT/AT2006/000164 filed Apr. 25, 2006. The international application under PCT article 21(2) was not published in English.

The invention relates to a device for protecting a photovoltaic plant against rodent bite damage, wherein the photovoltaic plant comprises several components, among them solar cells, a control unit, an inverter, an internal voltage supply means and at least one microcontroller which are interconnected via corresponding lines.

From WO 94/06287 A1, DE 102 41 835 A1, U.S. Pat. No. 4,484,315 A, DE 203 19 735 U1 and EP 664 079 A1, devices for dispelling pests, in particular rodents, are known in which ultrasonic waves are emitted which can be varied at random with regard to their frequency and/or amplitude to avoid the effect of getting used to them.

From DE 34 43 568 C2 an ultrasonic transmitter for protecting motor vehicles against animal bite damage is known. Supply of the ultrasonic transmitter, which is accommodated in a separate housing, is externally from the battery of the motor vehicle or from a standardized mains socket. The ultrasonic signal may be non-repetitively varied in pitch, acoustic pressure and the intervals between the acoustic signals. This is effected by means of a random generator integrated in the microcontroller of the ultrasonic transmitter that produces the ultrasonic signal.

What is detrimental in this case is that the ultrasonic transmitter is integrated in a separate, closed housing. This requires an external power supply which often causes higher power consumption. Moreover, the supply lines for the power supply have to be laid separately. This causes additional expenditures for the person operating the ultrasonic transmitter.

Devices for dispelling pests, based on sound waves which may be supplied with electricity by solar energy, are known e.g. from SE 469 312 B, U.S. Pat. No. 6,570,494 B1, U.S. Pat. No. 5,864,516 A and DE 41 25 402 A1.

The invention has as its object to provide an above-indicated device by means of which a photovoltaic plant can be effectively protected against damage resulting from bites. Installation and maintenance expenditures shall be as low as possible.

The object of the invention is achieved in that an ultrasonic transmitter is provided for emitting an ultrasonic signal and the ultrasonic transmitter is connected to a microcontroller of the photovoltaic plant so that the ultrasonic signal emitted is controllable via the photovoltaic plant. Thus, protection against damage from animal bites is effected via an ultrasonic transmitter, the control of which is effected via the photovoltaic plant, or via a microcontroller already present in the photovoltaic plant, respectively. Since the ultrasonic transmitter is connected to a microcontroller of the photovoltaic plant, the ultrasonic signal emitted by the ultrasonic transmitter can be controlled on the basis of measurement results supplied by the microcontroller. By monitoring the photovoltaic plant by means of the microcontroller, failures that may, e.g., be caused by animal bites, can be recognized in good time and used for influencing the ultrasonic signal.

Advantageously, the ultrasonic transmitter is integrated in a component of the photovoltaic plant, in particular the inverter and/or the control means. By integrating the ultrasonic transmitter in a component of the photovoltaic plant, no additional installation and maintenance expenditures will be incurred for the operator of the photovoltaic plant.

The ultrasonic signal may be controlled in dependence on the time of day. Thus, e.g., the power consumption of the ultrasonic transmitter can be lowered during the daytime during which many rodents are not active.

By connecting the ultrasonic transmitter with the internal voltage supply means of the photovoltaic plant, it is advantageously achieved that the ultrasonic transmitter will be automatically activated when a component of the photovoltaic plant is put into operation. The internal voltage supply means may be formed by a battery, whereby the ultrasonic transmitter will continue to be supplied in case an external voltage supply means fails and, thus, the components of the photovoltaic plant will be effectively protected against damage from animal bites.

According to a further feature of the invention it is provided for the ultrasonic transmitter to be connected to an internal data bus of the photovoltaic plant. Via this data bus, the ultrasonic transmitter can be supplied with information from the photovoltaic plant, in particular with regard to the status of the solar cells, but it can also be supplied with current.

If the ultrasonic transmitter is connected to a remote access of the photovoltaic plant, the ultrasonic transmitter can also be influenced via this remote access and the ultrasonic signal can thus be altered.

The ultrasonic transmitter can be configured via the remote access of a component of the photovoltaic plant.

According to a further characteristic feature of the invention, a memory is provided which is connected to the microcontroller. Via this memory, protocolling of, e.g. failure of solar cells with corresponding failure date and failure time can be effected.

For reducing the electric power consumption of the ultrasonic transmitter, e.g. during the daytime, a daylight control sensor can be provided for sensing the light intensity, which sensor is connected to the microcontroller which activates the ultrasonic transmitter.

Finally, also within the ultrasonic transmitter itself, a microcontroller can be arranged which changes the parameters of the ultrasonic signal emitted. By changing the frequency, volume, on-period, or pause, respectively, for generating the ultrasonic signal, an effect of the animals' getting used to the ultrasonic signal can be reduced or excluded, respectively.

By the fact that the ultrasonic transmitter can be configured, it is advantageously achieved that the frequency, volume and on-time, or pause, respectively, for generating the ultrasonic signal can be changed and, thus, the effect of the rodents getting used to the ultrasonic signal can be excluded.

In order to exclude an effect of getting used to the signals, the ultrasonic transmitter preferably emits a non-repetitive ultrasonic signal which varies at random in the parameters frequency, volume and/or on-period, or pause, respectively, the parameters for the ultrasonic signal being adjusted via the microcontroller of the photovoltaic plant.

Supplying of a component of the photovoltaic plant can be effected via a data bus, preferably with an alternating voltage.

The present invention will be explained in more detail by way of the accompanying schematic drawings.

Figure 2:
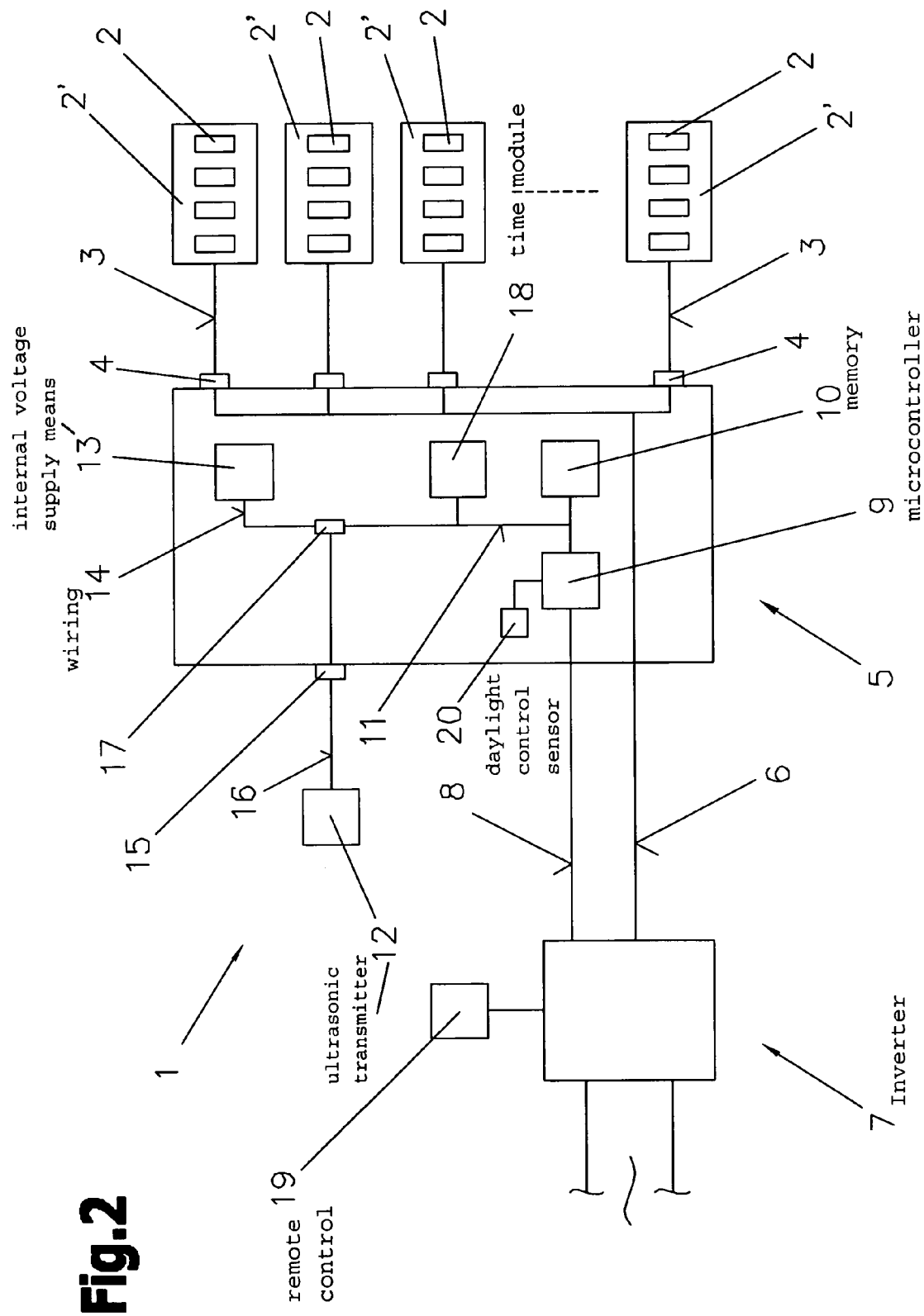

Therein,

FIG. 1 shows the components of a photovoltaic plant with an integrated ultrasonic transmitter in a schematic illustration; and FIG. 2 shows the components of a photovoltaic plant with an ultrasonic transmitter connected thereto, in a schematic illustration.

In FIG. 1, the set-up of a photovoltaic plant 1 is illustrated, which serves to transform the direct current produced from sunlight into an alternating current in conformity with the mains. The direct current is generated by solar cells 2, wherein preferably several solar cells 2 are connected in series in the form of a so-called string 2'. In order to enable an economic utilization of the photovoltaic plant 1, several strings 2' usually are connected in parallel. Via lines 3, the solar cells 2, or strings 2', respectively, are connected to corresponding terminals 4 of a control unit 5 ("string control"). The control unit 5 bundles and monitors the direct current supplied via the lines 3 and conducts it via lines 6 to an inverter 7 which converts the direct current into an alternating current in conformity with the mains.

The inverter 7 and the control unit 5 are, e.g., interconnected via a data bus 8. The data bus 8 serves to exchange data between the individual components of the photovoltaic plant 1 and supplies them with the required voltage, preferably between 8 and 12 Volts. Furthermore, the data bus 8 enables a remote access to the components. The remote access is, e.g., used for maintenance, configurations, software updates or status requests.

Preferably, the status request is made to the control unit 5, since the latter continuously monitors the status of the individual terminals 4. Thus, the control unit 5 knows which solar cells 2, or strings 2', respectively, are active and how much direct current they supply. This monitoring is controlled by a microcontroller 9 integrated in the control unit 5. By monitoring whether or not the solar cells 2 supply direct current, the microcontroller 9 is able to distinguish between day and night hours, since sunlight is not available during the night hours and, thus, cannot be transformed into a direct current. The microcontroller 9 may, however, also receive the information for determining the time of day via the data bus 8, or via a separate time module 18. The statuses resulting from the monitoring of the terminals 4 of the control unit 5 can be stored in a memory 10. For this purpose, the memory 10 is connected to the microcontroller 9 by means of an internal data bus 11 which likewise can supply the current required for an operation thereof. Thus, the statuses may, e.g., be scanned via the remote access. Due to the continuous monitoring, a failure of a solar cell 2, or of a string 2', respectively, can immediately be realized. The sudden failure of a solar cell 2, or of a string 2', respectively, with the corresponding failure date and failure time known to the microcontroller can be stored in memory 10 or, e.g., sent directly to a control center for errors via data bus 8.

The error may, e.g., be due to a defect of the solar cells 2 which may, e.g., have been caused by the animal bites, in particular, bites from rodents, such as mice, rats or martens. This is due to the fact that the direct current of a photovoltaic plant 1 is generated from sunlight, for which reason the solar cells 2, or strings 2', respectively, are mainly mounted outdoors, e.g. on roofs or on the ground, and thus, are subjected to atmospheric conditions. Therefore, the solar cells 2 and the lines 3, 6 and terminals 4 are mostly freely accessible to animals. As is generally known, particularly from the field of motor vehicles, these animals often cause damage by bites which, e.g., restrict or prevent the function of the motor vehicles. This is why for protecting against damage from animal bites, ultrasonic transmitters 12 are used, the ultrasonic signals of which are intended to dispel the animals. Since over time, the animals may get used to the ultrasonic signal emitted by the ultrasonic transmitter 12 continuously or repeatedly at time intervals which is in the frequency range of approximately 20 kHz to 30 kHz, the ultrasonic transmitter 12 will lose its effectiveness. Therefore, the ultrasonic signal preferably is non-repetitively varied in frequency, volume and on-period or pauses, respectively, by means of a random generator, whereby an effect of the animals' getting used to it is avoided and a more or less lasting protection against damage from bites is achieved.

According to the present invention, such an ultrasonic transmitter 12 is used for the protection of lines 3, 6, terminals 4 and components of the photovoltaic plant 1. According to FIG. 1, the ultrasonic transmitter 12 is used in the photovoltaic plant 1 such that the ultrasonic transmitter is integrated in the housing of a component of the photovoltaic plant 1, such as the control unit 5 and/or the inverter 7. Furthermore, the ultrasonic transmitter 12 is connected to the internal voltage supply means 13 of the respective component of the photovoltaic plant 1 and to a microcontroller 9 of the photovoltaic plant 1.

Thus, the expenditures for the operator of a photovoltaic plant 1 are reduced, since this operator would require a separate, water-proof terminal for the supply line for an ultrasonic transmitter 12 known from the prior art, as well as a separate microcontroller.

Preferably, the voltage supply means of the ultrasonic transmitter 12 integrated in a component of the photovoltaic plant 1, e.g. in the control unit 5, is effected via the internal data bus 11. The internal data bus 11 preferably accepts the voltage of from 8 to 12 Volts delivered by the data bus 8 for supplying the control unit 5. Likewise, it is possible that the data bus 8 supplies an alternating voltage, in particular in case of larger distances between the components of the photovoltaic plant 1, and that this alternating voltage is transformed with suitable circuits to the internal supply voltage of from 8 to 12 Volts of a component. In this manner, an existing photovoltaic plant 1 can easily be enlarged with the integrated ultrasonic transmitter 12 according to the invention via the internal data bus 11. Furthermore, current consumption is substantially minimized as compared to an external ultrasonic transmitter 12 that is supplied in a standardized way with voltage from the mains, and therefore costs will be saved. In this way it is furthermore achieved that in a photovoltaic plant 1, in particular in a stand-alone inverter system, the duration of the energy supply for the consumers will be extended.

The costs of the electric current and the amount of the current consumed by the ultrasonic transmitter 12 can also be additionally lowered by a time-dependent control, e.g. by the microcontroller 9 of the control unit 5, or also by a separate time module 18. This may be done such that during the daytime, the ultrasonic transmitter 12 is deactivated, or the volume, or the output, respectively, of the ultrasonic signal is reduced. When dusk arrives, at which time rodents become active, the ultrasonic transmitter 12 is activated, or the volume, or the output, respectively, of the ultrasonic signal is appropriately increased. Dusk is recognized by the microcontroller 9, e.g., preferably via the measurement of the direct current supplied by the solar cells 2, or the strings 2', respectively. Likewise, dusk can be recognized via a clock integrated in the microcontroller 9, a separate time module 18 or via a daylight control sensor 20.

By these measures, an overall low current consumption by the ultrasonic transmitter 12 can be achieved. In this way it is also possible to supply the ultrasonic transmitter 12 and the microcontroller of a component which generates the ultrasonic signal with current from an internal voltage supply means 13, in particular a battery, in case of a possible current outage. The internal voltage supply means 13 is integrated in the control unit 5, e.g., and appropriately connected to the ultrasonic transmitter 12 via a suitable wiring 14. The internal voltage supply means 13, in particular the battery, may, e.g., be charged through the external current supply means via the data bus 8 and, further via the internal data bus 11. Likewise, it is possible that the internal voltage supply means 13, in particular the battery, is charged by the direct current supplied by the solar cells 2, or the strings 2', respectively. This is so when the direct current supplied by the solar cells 2 is too low for generating an alternating current. By the internal voltage supply means 13, the photovoltaic plant 1 and its components, respectively, will be protected against failures, or damage, respectively, caused by animal bites, even in case of a power outage.

By the low current consumption of the ultrasonic transmitter 12, the effect of the ultrasonic transmitter 12, and of the ultrasonic signal, respectively, is not negatively affected. The effect of the ultrasonic transmitter 12 may, e.g., be changed via the internal data bus 11, since in this way a communication between the microcontroller 9 of the control unit 5 and the ultrasonic transmitter 12 is enabled.

As has already been mentioned, the microcontroller 9 monitors the individual lines 3 of the solar cells 2, or of the strings 2', respectively, which are connected to the terminals 4 of the control unit 5, as well as the line 6 between the inverter 7 and the control unit 5. In this way, the microcontroller 9 recognizes an error, or a failure, respectively, for instance, when a solar cell 2 does not deliver a direct current any longer for unknown reasons. From the experience values of operators of photovoltaic plants 1 it is known that such causes most probably go back to damage resulting from animal bites on lines 3, or 6, respectively, or terminals 4. Therefore, when such failures occur, the microcontroller 9 of the control unit 5 preferably reacts such that it confers this information via the internal data bus 11 to the ultrasonic transmitter 12, and that the ultrasonic transmitter 12 is immediately activated, respectively. Simultaneously, the failure detected by the microcontroller 9 may be stored and/or sent to the error control center via the data bus 8. The ultrasonic transmitter 12 may change the emitted ultrasonic signal appropriately so as to dispel animals which have caused the bite damage. In this way, additional bite damage can be prevented which the animal probably would cause. By this measure, damage on, or failures of, respectively, the photovoltaic plant 1 can be reduced and, thus, reductions in energy yield and financial losses involved therewith for the operator can be contained.

Changing the ultrasonic signal in case of an unknown failure is effected such, e.g., that the volume is highly increased for a random period of time so as to scare the animal and dispel it. Likewise, the frequency of the ultrasonic signal may be changed accordingly so as to prevent further bite damage by the animal. Yet, also the on-time can be increased, or the pauses shortened so as to obtain the respective effect.

In general, the parameters of the ultrasonic signal, i.e. its frequency, volume and on-time or pause, respectively, can be generated from the random function of the microcontroller of a component of the photovoltaic plant 1, such as the microcontroller 9 of the control unit 5, as already known from the prior art. According to the invention, the values are taken from a table which has been generated with the help of the random generator integrated, e.g., in the microcontroller 9 of the control unit 5. From this table, a random combination of frequency, volume and on-time or pause, respectively, is chosen. Here, the values for the frequency range from 19 to 30 kHz, the volume ranges from 75 to 90 dB, and the on-time, or pauses, respectively, range from 2 to 20 seconds. For the likewise known effect of the animals getting used to the signals not occurring, each chosen value for the combination of the ultrasonic signal to be emitted is changed by a further randomly generated value. By the combination of two randomly generated values for frequency, volume and on-time, or pause, respectively, it is ensured that the values for the ultrasonic signal of the ultrasonic transmitter 12 will hardly be repeated.

A repetition of the ultrasonic signals of the ultrasonic transmitter 12 can also be avoided by changing the values via the remote access and the data bus 8 on a regular basis. For instance, via the remote access or a remote control 19, certain frequency values can be pre-chosen for the random generator of the microcontroller 9, from which the latter generates the table from which the random ultrasonic signal is chosen, with the random combination of frequency, volume and on-time or pause, respectively.

Such an update for ultrasonic signals is effected e.g. on the microcontroller 9 of the control unit 5 which can be accessed via the data bus 8. Subsequently, the microcontroller 9 processes the data obtained by the update and further transmits the ultrasonic signal generated therefrom to the ultrasonic transmitter 12 via the internal data bus 11. Via the internal data bus 11, the microcontroller of a component of the photovoltaic plant 1 is informed about the status of the ultrasonic transmitter 12 and scans the latter, e.g. in cycles, with the current status preferably being deposited in the memory 10. Therefore, via the remote access, or the remote control 19, respectively, and the data bus 8, the function of the ultrasonic transmitter 12 can be checked in a simple manner. This may e.g., be integrated in the monitoring software of the components of the photovoltaic plant 1 which is installed on a personal computer. The computer in turn can access the components of the photovoltaic plant 1 via the remote access, e.g. via the internet or via a telephone modem.

As illustrated in FIG. 2, it is also possible for the components of a photovoltaic plant 1 to include a terminal 15 for activating the ultrasonic transmitter 12 in addition to or instead of the ultrasonic transmitter 12 integrated in the housing of a component. In this case, the ultrasonic transmitter 12 is externally connected to the housing of a component, at terminal 15. This is effected, e.g., via an external data bus 16 which is connected to the internal data bus 11 via the terminal 15. In this way, the externally arranged ultrasonic transmitter 12 can be supplied with current, and the data can be obtained from the microcontroller of a component of the photovoltaic plant 1, e.g. the microcontroller 9 of the control unit 5. Thus, above all the status request and the emitting of the ultrasonic signals generated or controlled by, e.g., the microcontroller 9 are enabled. In this way, the ultrasonic transmitter 12 can be suitably positioned so as to increase the protection of the components of the photovoltaic plant 1, in particular of the terminals 4 and the lines 3, 6 of the control unit 5, against damage resulting from bites.

In the embodiment illustrated, the internal data bus 11 is interrupted by a terminal unit 17 to which the wiring 14 of the internal voltage supply means 13 is connected. Thus, again, the components of the photovoltaic plant 1 are protected against damage resulting from rodent bites in case of a possible power outage, since the ultrasonic transmitter 12 and the associated microcontroller will be supplied with electric power.

Of course, the externally arranged ultrasonic transmitter 12 can also be connected to an external current supply, e.g. a conventional mains socket. The ultrasonic signal of the ultrasonic transmitter 12 can continue to be generated, or controlled, respectively, by a microcontroller of the photovoltaic plant 1, and conducted to the ultrasonic transmitter 12 via the internal data bus 11 and the external data bus 16.

In general, it should be mentioned with regard to FIGS. 1 and 2 that it is, of course, also possible for the control of the ultrasonic signal emitted by the ultrasonic transmitter 12 to be taken over by a separate microcontroller integrated in the ultrasonic transmitter 12. This microcontroller will then communicate, e.g., with the microcontroller of a component of the photovoltaic plant 1, for instance with the microcontroller 9 of the control unit 5 via the internal data bus 11.

It is just as well possible that the microcontroller of a component of the photovoltaic plant further transmits an alike or also a different ultrasonic signal to several ultrasonic transmitters 12, arranged internally or externally. In this way, a redundancy of the ultrasonic transmitter 12 is ensured and, thus, the components of the photovoltaic plant 1 will optimally be protected against damage resulting from bites.

The invention claimed is:

1. A photovoltaic plant comprising a device for protecting this photovoltaic plant against rodent bite damage, wherein the photovoltaic plant comprises several components, among them solar cells, a control unit, an inverter, an internal voltage supply and at least one microcontroller integrated in the control unit, said components being interconnected via corresponding lines, wherein the device comprises an ultrasonic transmitter integrated in the inverter for emitting an ultrasonic signal, and the ultrasonic transmitter is connected to the at least one microcontroller, the control unit monitoring status of individual terminals for connection with the solar cells to determine which solar cells are active and how much direct current the solar cells supply, the at least one microcontroller controlling said monitoring such that the ultrasonic signal emitted is controllable in dependence on the direct current delivered from the solar cells and on when dusk is recognized by the at least one microcontroller via measurement of the direct current supplied by the solar cells.

2. The photovoltaic plant according to claim 1, wherein the device is integrated in a component of the photovoltaic plant.

3. The photovoltaic plant according to claim 2, wherein the device is integrated in the control unit.

4. The photovoltaic plant according to claim 1, wherein the ultrasonic signal is controllable in dependence on the time of day.

5. The photovoltaic plant according to claim 1, wherein the ultrasonic transmitter is connected to the internal voltage supply of the photovoltaic plant.)

6. The photovoltaic plant according to claim 1, wherein the ultrasonic transmitter is connected to an internal data bus of the photovoltaic plant.)

7. The photovoltaic plant according to claim 1, wherein the ultrasonic transmitter is connected to a remote access of the photovoltaic plant.)

8. The photovoltaic plant according to claim 7, wherein the ultrasonic transmitter can be configured via the remote access of a component of the photovoltaic plant.

9. The photovoltaic plant according to claim 1, further comprising a memory connected to the at least one microcontroller.

10. The photovoltaic plant according to claim 1, further comprising a daylight control sensor connected to the at least one microcontroller.

11. The photovoltaic plant according to claim 1, wherein a further microcontroller is arranged in the ultrasonic transmitter.

12. The photovoltaic plant according to claim 1, wherein the ultrasonic transmitter emits a non-repetitive ultrasonic signal which randomly varies with regard to its parameters frequency, volume and/or on-time, or pause, respectively, the parameters of the ultrasonic signal being adjustable via the microcontroller of the photovoltaic plant.

13. The photovoltaic plant according to claim 1, wherein the supply of the components of the photovoltaic plant via a data bus is effected with an alternating voltage.

\* \* \* \* \*

UNITED STATES PATENT AND TRADEMARK OFFICE
CERTIFICATE OF CORRECTION

PATENT NO. : 8,081,065 B2
APPLICATION NO. : 11/922514
DATED : December 20, 2011
INVENTOR(S) : Martetschläger et al.

It is certified that error appears in the above-identified patent and that said Letters Patent is hereby corrected as shown below:

In the Claims:

In Column 8, line 12 (Claim 5) after "plant" please delete: ")".

In Column 8, line 15 (Claim 6) after "plant" please delete: ")".

In Column 8, line 18 (Claim 7) after "plant" please delete: ")".

Signed and Sealed this
Third Day of September, 2013

Teresa Stanek Rea
*Acting Director of the United States Patent and Trademark Office*